United States Patent [19]

Oka et al.

[11] 4,324,629
[45] Apr. 13, 1982

[54] PROCESS FOR REGENERATING CHEMICAL COPPER PLATING SOLUTION

[75] Inventors: Hitoshi Oka, Yokohoma; Hiroshi Kikuchi, Zushi; Hitoshi Yokono, Yokohama; Haruo Suzuki; Toyofusa Yoshimura, both of Katsuta; Akira Matsuo, Yokohama; Osamu Miyazawa; Isamu Tanaka, both of Yokosuka; Tokio Isogai, Fujisawa, all of Japan

[73] Assignee: Hitachi, Ltd., Tokyo, Japan

[21] Appl. No.: 160,201

[22] Filed: Jun. 17, 1980

[30] Foreign Application Priority Data

Jun. 19, 1979 [JP] Japan .................................. 54/77161
Mar. 27, 1980 [JP] Japan .................................. 55/38236
Mar. 27, 1980 [JP] Japan .................................. 55/38237

[51] Int. Cl.³ ...................... B01D 13/02; C25D 21/16
[52] U.S. Cl. ................................ 204/180 P; 204/130; 204/151; 204/DIG. 13
[58] Field of Search ................... 204/180 P, 301, 130, 204/151, 44, 52, DIG. 13

[56] References Cited

U.S. PATENT DOCUMENTS 3,761,369  9/1973  Tirrell ........................ 204/180 P X
3,764,503  10/1973  Lancy et al. .................... 204/180 P
4,105,532  8/1978  Haines et al. ............... 204/180 P X

OTHER PUBLICATIONS

Kirk-Othmer, *Encyclopedia of Chemical Technology*, "Electrodialysis", vol. 7, 2nd ed., pp. 849+850 (1965).

*Primary Examiner*—Arthur C. Prescott
*Attorney, Agent, or Firm*—Craig and Antonelli

[57] ABSTRACT

During recyclic use of a chemical copper plating solution, counter anions to copper ions, anions formed by oxidation of a reducing agent, and carbon dioxide by absorption of carbon dioxide from air, which all have an inhibiting effect upon the plating, and also sodium ions having no inhibiting effect are accumulated in the plating solution.

These accumulated ions can be removed by electrodialysis. Particularly, regeneration can be satisfactorily regenerated by adjusting the pH of used chemical plating solution to 2–11 before the electrodialysis, and using a selectively monovalent anion permeable membrane as an anion exchange membrane at the electrodialysis.

6 Claims, 3 Drawing Figures

PROCESS FOR REGENERATING CHEMICAL COPPER PLATING SOLUTION

BACKGROUND OF THE INVENTION

1. Field of the Invention

This invention relates to a process for regenerating a chemical copper plating solution by selectively removing chemical plating reaction-inhibiting components from used chemical copper plating solution.

2. Brief Description of the Prior Art

A chemical copper plating solution contains copper ions, a reducing agent for copper ions, a chelating agent for copper ions, and an alkali metal hydroxide as essential components.

In continued use of a chemical copper plating solution having such a composition as above, components having an inhibiting effect upon the chemical plating reaction will accumulate in the plating solution. That is, the copper ions consumed in the chemical plating reaction is supplemented to maintain its optimum concentration. In that case, copper ions are supplemented in the form of an aqueous solution of copper compound. Thus, counter anions to the copper ions will be accumulated in the plating solution by repeated supplementation of copper ions. For the supplementation, copper sulfate is used as the copper compound on an economical ground, and thus sulfate ions are usually accumulated in the plating solution.

As the reducing agent for copper ions, formaldehyde is mainly used also on an economical ground. Formaldehyde can reduce copper ions to metallic copper at the plating, while the formaldehyde itself is oxidized to formic acid thereby, and formate ions are produced. Thus, the formaldehyde consumed in the chemical plating is supplemented to maintain its optimum concentration. Thus, formate ions will be accumulated in the plating solution by repeated supplementation of formaldehyde.

A chemical copper plating solution is generally alkaline and thus absorbs carbon dioxide from air, and accumulates carbonate ions in the plating solution.

Furthermore, an aqueous solution of alkali metal hydroxide is supplied to a chemical copper plating solution to adjust a pH that has changed during the chemical plating reaction. As the alkali metal hydroxide, sodium hydroxide is mainly used on an economical ground.

Anions such as sulfate ions, formate ions, carbonate ions, etc., when accumulated in a chemical copper plating solution, as described above, will capture divalent copper ions, resulting in deterioration of the stability of the plating solution, decomposition of the plating solution, and lowering of mechanical properties of plating film.

Heretofore, when the chemical copper plating solution contains such accumulated anions as above, $SO_4^{-2}$ in the plating solution is removed therefrom as $Na_2SO_4$ by precipitation, and the resulting plating solution has been reutilized (Japanese Laid-open Patent Specification No. 119428/77). However, these procedures are not preferable on account of very high plating chemical costs and plating solution disposal cost, and also a plating film with good quality has not been obtained.

SUMMARY OF THE INVENTION

An object of the present invention is to provide a process for regenerating a chemical copper plating solution, which is free from the above-mentioned disadvantages of the conventional art, and can selectively remove only plating reaction-inhibiting components from the chemical copper plating solution, thereby drastically improving the life of the plating solution, stabilizing the plating solution, thereby improving the quality of plating product and lowering the plating cost.

The above-mentioned object of the present invention can be attained by any of the following procedures (a) to (d).

(a) $SO_4^{-2}$ and $HCOO^-$, which have an inhibiting effect upon chemical plating reaction are to be removed by electrodialysis, using cation and anion exchange membranes capable of permeating monovalent and divalent cations and anions therethrough.

(b) The pH of a plating solution is adjusted to 2-8 to remove $CO_3^{-2}$ having a low selective permeability at the electrodialysis in advance and make the selective permeabilities of a group of the accumulated ions in the plating solution substantially equal to one another, and then the plating solution is subjected to electrodialysis using the same cation and anion exchange membranes as in (a), or the pH of a plating solution is made higher than 8 but not higher than 11 to convert $CO_3^{-2}$ to $HCO_3^-$ in advance, and then the plating solution is subjected to electrodialysis using the same cation and anion exchange membranes as in (a) to remove $SO_4^{-2}$, $HCOO^-$, and $CO_3^{-2}$ which have an inhibiting effect upon the chemical plating reaction.

(c) A chemical plating solution is subjected to electrodialysis, using anion exchange membranes selectively permeable to monovalent anions and cation exchange membranes permeable to monovalent and divalent cations, thereby removing $SO_4^{-2}$ and $HCOO^-$, which have an inhibiting effect upon the chemical plating reaction.

(d) The pH of a plating solution is adjusted to 2-8 to remove $CO_3^{-2}$ having a low selective permeability at the electrodialysis and at the same time to make the selective permeabilities of a group of the accumulated ions in the plating solution substantially equal to one another in advance and then the plating solution is subjected to the above-mentioned procedure (c), or the pH of the plating solution is adjusted to higher than 8, but not higher than 11 to convert $CO_3^{-2}$ to $HCO_3^-$ in advance and then the plating solution is subjected to the above-mentioned procedure (c) to remove $SO_4^{-2}$, $HCOO^-$ and $CO_3^{-2}$ which have an inhibiting effect upon the chemical plating reaction.

However, according to the procedure (a), it is difficult to remove $CO_3^{-2}$ in the plating solution, and some copper-chelated compound is leaked.

According to the procedure (b), some copper-chelated compound is leaked.

According to the procedure (c), no leaking of copper-chelated compound takes place, but $CO_3^{-2}$ cannot be removed at all.

According to the procedure (d), $CO_3^{-2}$ can be removed, and no leaking of copper-chelated compound takes place.

When the regenerating effect upon chemical copper plating solution is observed in terms of the strength of plating film, all of these procedures (a)-(d) have quite equal effects, but the effect of controlling copper ion discharge at the regeneration will be higher in the order of (a)<(b)<(c)<(d).

According to the present invention, the chelating agent for copper ions has nothing to do with the essential of the present invention, and thus the present invention can be applied also to regeneration of a chemical copper plating solution containing other chelating agent than those to be exemplified in the following examples, that is, a chelating agent incapable of forming monovalent copper ion-chelated compounds but capable of forming divalent copper ion-chelated compounds, such as nitrilotriacetic acid, iminodiacetic acid, cyclohexanediaminetetraacetic acid, and triethylenetetraminehexaacetic acid, their alkali metal salts, their phosphonic acid derivatives, phosphinic acid derivatives, etc.

The present invention can be applied also to regeneration of a chemical copper plating solution containing, as a reducing agent for copper ions, incipient cured products of formaldehyde, or glycol aldehyde, paraformaldehyde, dimethylhydantoin, glyoxal and similar products thereto as their derivatives, alkali metal borohydrides, boranes, etc.

Furthermore, the present invention can be applied also to regeneration of a chemical copper plating solution containing additives for improving the stability of the plating solution, the mechanical properties of plating film and the plating rate, such as cyanides, ethoxy surfactants, chelating agents capable of forming regular tetrahedronal complexes with monovalent copper ions, sulfur compounds, rare earth elements, etc.

Furthermore, the present invention can be applied also to regeneration of a chemical copper solution containing, as a copper source for the plating solution, all water-soluble copper compounds in the presence of the chelating agent for copper ions, for example, basic copper carbonate, copper hydroxide, copper nitrate, copper halides, copper formate, copper acetate, copper perchlorate, etc.

Furthermore, the present invention can be applied also to regeneration of a chemical copper plating solution containing, as a pH-controlling agent, an alkali metal hydroxide, preferably NaOH and KOH.

In the above-mentioned procedures (c) and (d), it is desirable to select compounds capable of releasing the inhibiting ions in the form of monovalent ions in view of the principle of the invention, but even if the compounds are incapable of releasing monovalent ions, the effect of the present invention will not be lost by replacing the ions with monovalent ions or converting the ions to monovalent ions by some additional means.

As an acid for treating accumulated ions to be used for pH adjustment, any acid can be used, so long as the acid residue of the acid has no considerable adverse effect upon the chemical copper plating reaction, and a particularly preferable acid is that capable of releasing an acid residue (anion) identical to the counter anion of the copper ions or the ions formed by oxidation reaction of the reducing agent used. For example, sulfuric acid, formic acid, acetic acid and perchloric acid are preferable.

DETAILED DESCRIPTION OF THE PREFERRED EMBODIMENTS

The present invention will be described in detail below, referring to Examples.

In the electrodialysis, preferable ion exchange membranes are selectively monovalent ion permeable membranes and selectively monovalent and divalent ion permeable membranes for both anion exchange membrane and cation exchange membranes, and selectively monovalent ion permeable membranes are particularly preferable for the anion exchange membrane.

EXAMPLE 1

Chemical copper plating is carried out in the following manner: A stainless steel plate is instantaneously electroplated in the ordinary pyrophosphoric acid copper electroplating solution to form plating nuclei for chemical plating, and then subjected to chemical copper plating to a plating thickness of about 30 $\mu$m. Then, the resulting plating film is peeled off, and cut to size of 1 cm $\times$ 10 cm, and used as test pieces for a drawing tester, whereby the mechanical properties of the plating film are measured.

Concentration of major components of a chemical copper plating solution are automatically detected during the plating, and controlled to predetermined concentration by means of an automatic control device for automatically making up for the shortage.

The stability of a plating solution is determined by visual observation of a point that a plating surface starts to turn dark brown, or that copper starts to deposit considerably onto the wall of a pyrex glass plating tank as the start of decomposition of the plating solution.

| (a) Chemical copper plating solution: | |
|---|---|
| $CuSO_4 \cdot 5H_2O$ | 13 g |
| EDTA-2Na | 40 g |
| 37% formalin | 5 ml |
| NaOH | amount to make pH 12.3 |
| $\alpha,\alpha'$-dipyridyl | 20 mg |
| Polyethyleneglycol-stearylamine | 0.01 mg |
| $K_2S$ | 0.01 mg |
| Water | amount to make 1 l. |
| Plating temperature | 70° C. |
| Plating load | 1 $dm^2/l$ |
| (b) Copper ion makeup solution: | |
| $CuSO_4 \cdot 5H_2O$ | 200 g |
| Water | amount to make 1 l |
| (c) Formaldehyde makeup solution: | |
| 37% formalin | 300 ml |
| Water | amount to make 1 l |
| (d) pH-controlling makeup solution: | |
| NaOH | 200 g |
| Water | amount to make 1 l |

The following ions are accumulated in the chemical copper plating solution from the composition of the chemical copper plating solution and the composition of the makeup solutions through the progress of plating reaction: $Na^+$, $SO_4^{-2}$, $HCOO^-$ and $CO_3^{-2}$.

Plating to the thickness of about 30 $\mu$m is presumed to be one run of plating, and when the plating is carried out in repetitions of plating, the following results as regards the mechanical properties of plating film, stability of plating solution and concentrations of accumulated components in the plating solution are obtained, as shown in Table 1.

TABLE 1

| Plating run | 1st | 2nd | 3rd | 4th | 5th |
|---|---|---|---|---|---|
| Elongation (%) | 5.6 | 4.3 | 3.3 | 2.3 | Impossible to measure |
| Tensile strength (kg/mm$^2$) | 48.0 | 51.2 | 55.7 | 59.4 | Impossible to measure |
| Sulfate ion concentration (M/l) | 0.095 | 0.14 | 0.18 | 0.22 | Impossible to measure |
| Formate ion concentration (M/l) | 0.085 | 0.17 | 0.26 | 0.34 | Impossible to measure |
| Carbonate ion solution (M/l) | 0.090 | 0.18 | 0.23 | 0.27 | Impossible to measure |
| Sodium ion concentration (M/l) | 0.85 | 1.2 | 1.5 | 1.7 | Impossible to measure |
| Stability of plating solution | Good | Good | Good | Somewhat unstable | Decomposed |

As is obvious from Table 1, the mechanical properties of plating film and the stability of plating solution are lowered by the accumulation of the four ion components and the plating solution is decomposed at the 5th run of plating.

The concentrations of accumulated components are determined by liquid chromatography and absorptiometry.

Electrodialysis of chemical copper plating solution is carried out firstly after 4 runs of chemical copper plating under the same conditions as above, using the same chemical copper plating solution and makeup solutions as above, and thereafter after every three runs of chemical copper plating to regenerate the chemical copper plating solution, where compositions of an electrode solution and concentration solution which will be hereinafter mentioned are as given below:

| (e) Concentration solution: | |
|---|---|
| HCOONa | 34 g |
| Water | amount to make 1 l |
| (f) Electrode solution: | |
| HCOONa | 68 g |
| Water | amount to make 1 l |

Figure 1:
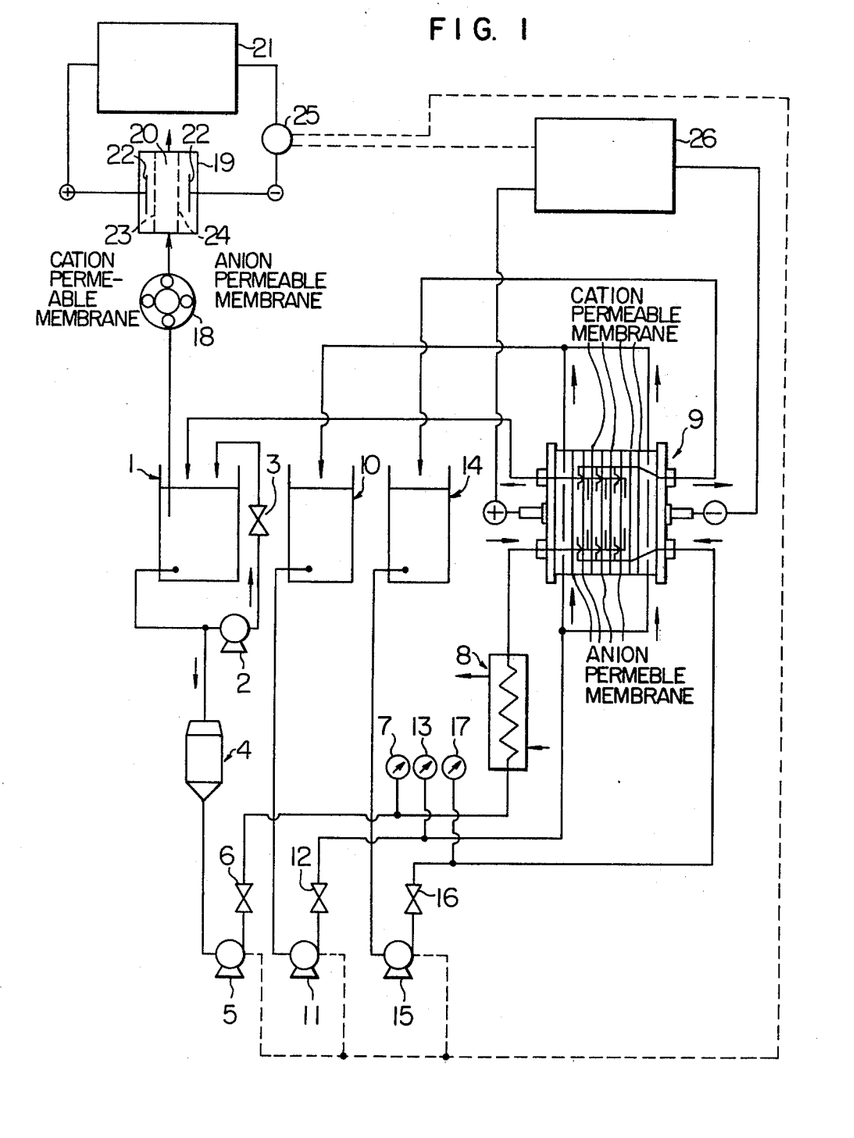
FIGS. 1 and 2 are flow diagrams showing regeneration systems according to embodiments of the present invention.

The system for electrodialysis as given in FIG. 1 is used in the following operating manner:

A chemical copper plating solution in a plating tank 1 is always recycled and mixed by passing the solution by a circulating pump 2 through a valve 3. The solution is branched from the circulating line, and passed through a filter 4 to a cooler 8 by a circulating pump 5 to cool the solution down to the room temperature, and then led to an electrodialysis cell 9. The chemical copper plating solution leaving the electrodialysis cell 9 is recycled to the plating tank 1.

The pressure in the electrodialysis cell 9 is kept to 0.05 atmospheres by controlling a valve 6 according to the indication of a pressure gage 7 in the branched circulating line. Electrode solution in an electrode solution tank 10 is led to the electrodialysis cell 9 by a circulating pump 11, and the pressure in the electrodialysis cell 9 is kept to 0.05 atmospheres by controlling a valve 12 according to the indication of a pressure gage 13. The electrode solution leaving the electrodialysis cell 9 is recycled to the electrode solution tank 10.

Concentration solution in a concentration solution tank 14 is led to the electrodialysis cell 9 by a circulating pump 15, and the pressure in the electrodialysis cell 9 is kept to 0.05 atmospheres by controlling a valve 16 according to the indication of a pressure gage 17. The concentration solution leaving the electrodialysis cell 9 is recycled to the concentration solution tank 14.

The electrodialysis cell 9 has an available membrane surface area of 209 cm$^2$ by use of 11 sheets each of anion exchange membranes (Cellemonion AMV, trademark of the product made by Asahi Glass Co., Ltd., Japan) and cation exchange membranes (Cellemion CMV, trademark of the product made by Asahi Glass Co., Ltd., Japan). In each of desalting compartments to which the chemical copper plating solution is led, the cation exchange membrane is arranged at the side toward the cathode, and the anion exchange membrane is arranged at the side toward the anode, and there are 9 desalting compartments.

Starting and discontinuation of electrodialysis are carried out in the following manner.

The chemical copper plating solution is sampled at a rate of 50 ml/hr by a constant rating pump 18 during the plating and led to a desalting compartment 20 in a small electrodialysis cell 19 for detecting the accumulated ions, where a potential of 4 V is applied to anode and cathode in electrode compartments 22 from a constant potential source 21. In the desalting compartment 20, a cation exchange membrane (Cellemion AMV) 23 and an anion exchange membrane (Cellemion ASV) 24 are arranged so that each membrane can have an available membrane surface area of 20 cm$^2$, and the accumulated ions in the chemical copper plating solution are dialyzed through the cation and anion exchange membranes by electrodialysis under constant potential. Quantity of dialysis current is measured by a current meter 25, and when the quantity of the measured current is larger than the predetermined current value, a constant current source 26 and the circulating pumps 5, 11 and 15 are automatically or manually driven to regenerate the plating solution, whereas the driving of them is automatically or manually discontinued when the measured quantity of current becomes smaller than the predetermined current value. Concentrations of $HCOO^-$, $SO_4^{-2}$, and $CO_3^{-2}$ can be detected in the foregoing manner.

Regeneration of the chemical copper plating solution is carried out in the foregoing regeneration system while the chemical copper plating is repeated.

The current value of current meter 25 exceeded 0.55 A firstly at the 4th run of plating, and thus the plating solution was subjected to electrodialysis at a current density of 4 A/dm$^2$ after the 4th run of plating. Thereafter, the plating solution was subjected to electrodialysis for 0.5-2 hours after every three runs of plating under the same conditions, that is, after 4th, 7th, 10th, 13th and 16th runs of plating to regenerate the chemical copper plating solution. Results are shown in Table 2.

As is obvious from Table 2, mechanical properties of plating film are deteriorated by accumulation of such ions as $SO_4^{-2}$, $HCOO^-$, $CO_3^{-2}$ and $Na^+$ in the plating solution by repeated runs of plating, but the accumulated ions can be removed by electrodialysis and the mechanicl properties of plating film can be recovered thereby. As shown in Table 2, the mechanical properties of plating film can be recovered after every regeneration operation. As a result of total 10 runs of regeneration operation it was found that the plating solution was stable throughout and such excellent mechanical properties of plating film as elongation: 3% and tensile strength: more than 45 kg/mm² were obtained.

It was also found in the electrodialysis that the selective permeation coefficient on the basis of $HCOO^{-1}$ as the reference was $SO_4^{-2}$: 1.1, $CO_3^{-2}$:0.5, Cu-$EDTA^{-2}$:0.15 and $EDTA^{-4}$:0.15, and the ion species are more readily permeable in the following order:

$$SO_4^{-2} \geqq HCOO^- > CO_3^{-2} > Cu\text{-}EDTA^{-2} \simeq EDTA^{-4}$$

Thus, it was found that only $SO_4^{-2}$, $HCOO^-$ and $CO_3^{-2}$, that is, only plating reaction-inhibiting components, could be selectively removed from the chemical copper plating solution, and the plating solution could be regenerated thereby. Cations in the regenerated plating solution were only alkali metal ions, and thus it was found that the alkali metal ions could be removed at a current efficiency of about 100%.

It was found that the discharge of the chelating agent for copper ions by one run of the regeneration treatment was as small as less than 2-3% of the initial concentration in the plating solution.

EXAMPLE 2

| (a) Chemical copper plating solution: | |
|---|---|
| CuSO₄ . 5H₂O | 10 g |
| Trisodium hydroxyethylethylenediaminetriacetate (HEDTA) | 28 g |
| 37% formalin | 10 ml |
| NaOH | amount to make pH 12.3 |
| α,α'-dipyridyl | 10 mg |
| Polyethyleneglycol-stearylamine | 100 mg |
| Water | amount to amke 1 l |
| (b) Plating conditions: | |
| Plating temperature | 70° C. |
| Plating load | 1 dm²/l |
| (c) Copper ion makeup solution: | |
| Same as in Example 1. | |
| (d) Formaldehyde makeup solution: | |
| Same as in Example 1. | |
| (e) pH-controlling makeup solution: | |
| Same as in Example 1. | |
| (f) Concentration solution: | |
| Same as in Example 1. | |
| (g) Electrode solution: | |
| same as in Example 1. | |

The above-mentioned chemical copper plating solution has such an advantage as a high plating rate of 5 μm/hr. In the same regeneration system as used Example 1 and shown in FIG. 1, electrodialysis is carried out in the same manner as in Example 1, that is, firstly after the 4th run of plating, and thereafter after every three runs of plating at a current density of 4 A/dm² for 0.5-2 hours. Results are shown in Table 3.

It was found that the discharge of the chelating agent for copper ions by one run of the regeneration treatment was as small as less than 2-3% of the initial concentration in the plating solution.

TABLE 2

| Plating run | 1st | 2nd | 3rd | 4th | 5th | 6th | 7th | 8th | 11th | 14th | 17th |
|---|---|---|---|---|---|---|---|---|---|---|---|
| Elongation (%) | 5.8 | 4.7 | 3.9 | 2.5 | 5.0 | 4.1 | 3.1 | 5.5 | 5.3 | 5.2 | 5.2 |
| Tensile strength (kg/mm²) | 46.7 | 50.9 | 55.5 | 57.9 | 49.4 | 52.6 | 56.4 | 45.3 | 46.1 | 48.1 | 49.5 |
| Sulfate ion concentration (M/l) | 0.10 | 0.14 | 0.18 | 0.22 | 0.081 | 0.12 | 0.17 | 0.05 | 0.07 | 0.09 | 0.06 |
| Formate ion concentration (M/l) | 0.085 | 0.17 | 0.26 | 0.34 | 0.20 | 0.29 | 0.37 | 0.10 | 0.15 | 0.17 | 0.18 |
| Carbonate ion concentration (M/l) | 0.085 | 0.17 | 0.23 | 0.29 | 0.22 | 0.28 | 0.33 | 0.14 | 0.17 | 0.20 | 0.21 |
| Sodium ion concentration (M/l) | 0.83 | 1.2 | 1.5 | 1.8 | 1.2 | 1.5 | 1.8 | 0.88 | 1.0 | 1.1 | 1.1 |
| Stablity of plating solution | Good | Good | Good | Somewhat unstable | Good | Good | Somewhat unstable | Good | Good | Good | Good |

TABLE 3

| Plating run | 1st | 2nd | 3rd | 4th | 5th | 6th | 7th | 8th | 11th | 14th | 17th |
|---|---|---|---|---|---|---|---|---|---|---|---|
| Elongation (%) | 4.2 | 4.1 | 3.8 | 3.2 | 5.4 | 4.0 | 3.5 | 4.6 | 4.5 | 4.8 | 4.3 |
| Tensile strength (kg/mm²) | 42.5 | 42.0 | 44.1 | 51.3 | 40.3 | 43.2 | 48.7 | 42.3 | 42.0 | 41.2 | 44.1 |
| Sulfate ion concentration (M/l) | 0.08 | 0.13 | 0.17 | 0.20 | 0.07 | 0.12 | 0.18 | 0.06 | 0.08 | 0.06 | 0.06 |
| Formate ion concentration (M/l) | 0.09 | 0.18 | 0.30 | 0.37 | 0.16 | 0.27 | 0.37 | 0.16 | 0.07 | 0.05 | 0.06 |
| Carbonate ion concentration (M/l) | 0.07 | 0.14 | 0.22 | 0.29 | 0.17 | 0.26 | 0.34 | 0.18 | 0.18 | 0.17 | 0.18 |
| Sodium ion concentration (M/l) | 0.67 | 1.0 | 1.4 | 1.6 | 1.0 | 1.3 | 1.8 | 0.90 | 1.0 | 0.74 | 0.81 |
| Stability of plating solution | Good | Good | Good | Good | Good | Good | Good | Good | Good | Good | Good |

EXAMPLE 3

Chemical copper plating is carried out in the following manner. Stainless steel plate is at first electroplated instantaneously in the ordinary pyrophosphoric acid electroplating solution to form plating nuclei for chemical plating and then subjected to chemical copper plating in the following chemical copper plating solution to form a plating film.

| (a) Chemical copper plating solution: | |
| --- | --- |
| $Cu(HCOO)_2 4H_2O$ | 10 g |
| EDTA 2Na | 40 g |
| 37% formalin | 5 ml |
| $\alpha,\alpha'$-dipyridyl | 20 mg |
| Polyethyleneglycol-stearylamine | 100 mg |
| $K_2S$ | 0.01 mg |
| NaOH | amount to make pH 12.3 |
| Water | amount to make 1 l |

That is, the stainless steel plate with the plating nuclei is dipped in the above-mentioned chemical copper plating solution and subjected to chemical copper plating at a temperature of 70° C. and a load of 1 dm²/l. To keep copper ions, formalin and pH at constant values during the plating, makeup solutions and pH-controlling solution having the following compositions are automatically supplied, thereby making up for the shortage.

| (b) Copper ion makeup solution: | |
| --- | --- |
| $Cu(HCOO)_2 \cdot 4H_2O$ | 100 g |
| Water | amount to make 1 l |
| (c) Formaldehyde makeup solution: | |
| 37% formalin | 300 ml |
| Water | amount to make 1 l |
| (d) pH-controlling solution: | |
| NaOH | 200 g |
| Water | amount to make 1 l |

Air is always injected into the chemical plating solution during the chemical plating to stir the plating solution.

Plating to a thickness of about 30 μm is presumed to be one run of plating, and the resulting plating film is peeled off from the stainless steel plate, cut to a size of 1 cm×10 cm, and used as test pieces for a drawing tester, whereby the mechanical properties of the plating film are measured.

The amounts of $Na^+$, $HCOO^-$ and $CO_3^{-2}$ accumulated in the plating solution are analyzed by a sodium ion electrode and liquid chromatography, and concentrations of copper ions ad EDTA are measured by a spectrophotometer and an atomic absorption spectrometry.

Figure 2:
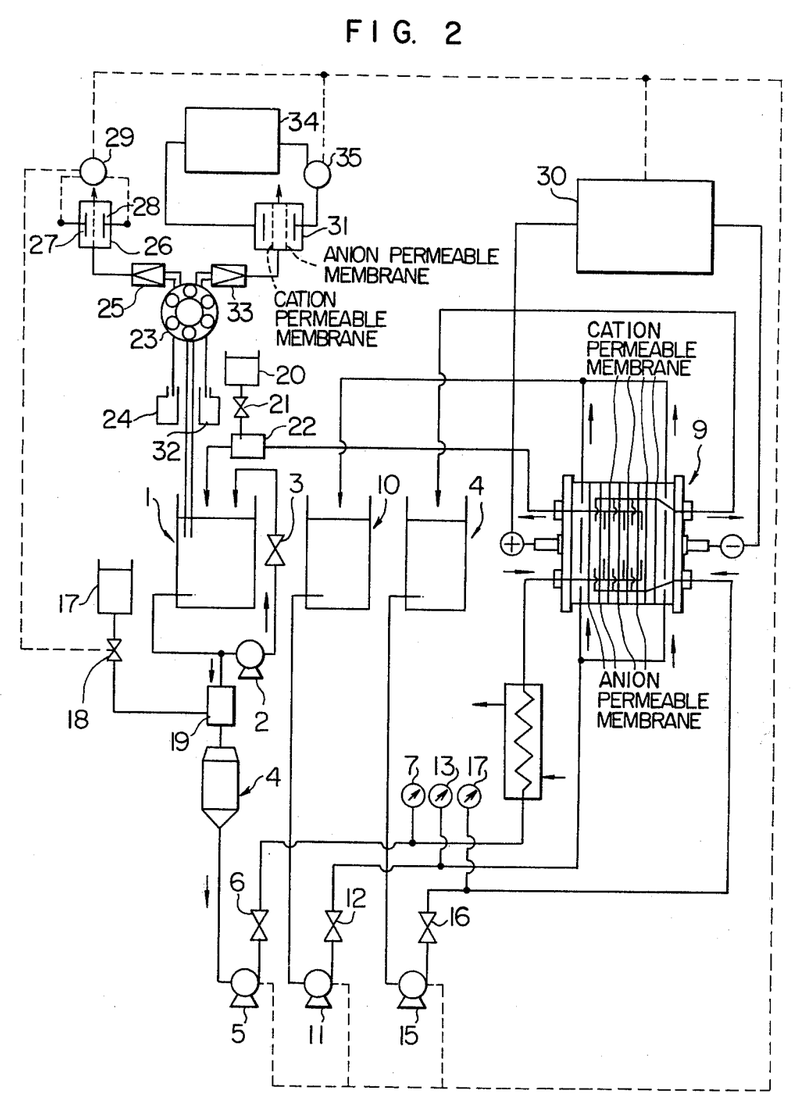

Chemical plating was carried out in the abovementioned chemical copper plating solution, and the plating solution having a pH of 12.3 after four runs of plating in the same chemical copper plating operation was branched into an acid-mixing tank 19 provided with an acid tank 17 and a valve 18 and provided between the outlet for the used plating solution from the plating tank 1 and the inlet to the filter 4 in the system of FIG. 1, as shown in FIG. 2 and was admixed with formic acid to adjust the pH to 11-2 to investigate the effect of changed pH.

Figure 3:
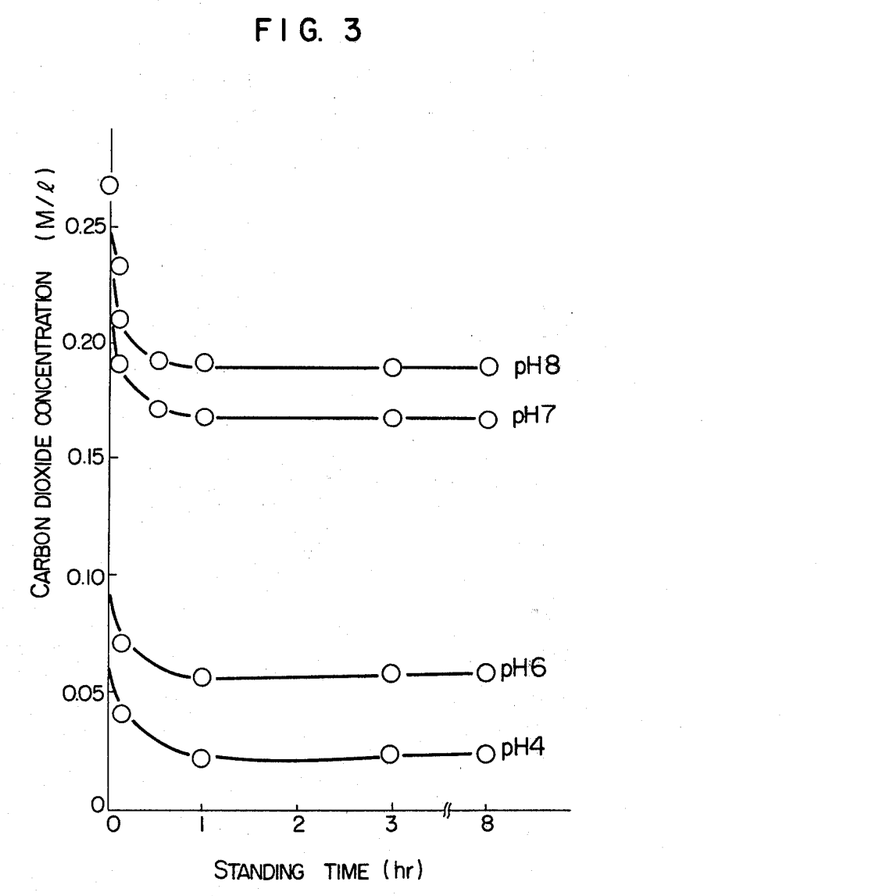
FIG. 3 is a diagram showing relationships between carbon dioxide concentration and standing time of chemical copper plating solution with varied pH values.

In FIG. 3, relationships between pH, the rate of carbon dioxide removal and residual content of carbon dioxide in the plating solution when pH is made lower than 8 are shown. It is obvious therefrom that carbon dioxide can be removed within about 30 minutes by making the pH of the plating solution lower than 8, and it is desirable to make the pH lower than 7 to remove carbon dioxide most efficiently. The pH below 2 is not preferable, because the chelating agent starts to precipitate in the plating solution.

The chemical copper plating solution having a pH of 12.3, and chemical copper plating solutions having pH values adjusted to 11, 10, 9 and 8 were electrodialyzed in the same manner as in Example 1, and the selective permeability of carbon dioxide at the electrodialysis was determined. As a result, it was found that the selective permeation coefficient of carbon dioxide on the basis of $HCOO^-$ was about 0 for pH 12.3, about 0.2 for pH 11, about 0.6 for pH 10, about 0.8 for pH 9 and about 1.0 for pH 8. That is, it was found that, when the used chemical copper plating solution containing carbon dioxide was electrodialyzed without adjusting pH, carbonate ions could not be removed from the plating solution at all, but the carbonate ions could be efficiently electrodialyzed in a pH range of 8-11, preferably 8-10.

It is seen therefrom that in the present process the electrodialysis for regeneration must be carried out by controlling the pH of the plating solution to 2-8 to remove the carbonate ions from the plating solution in advance or by controlling the pH to higher than 8 but not higher than 11 to facilitate the electrodialysis.

As the acid for controlling the pH, perchloric acid and acetic acid were investigated beside the abovementioned formic acid and sulfuric acid. It was found that perchloric acid and acetic acid could not give a very adverse effect upon the chemical plating reaction and thus could be used, though the plating becomes somewhat unstable because they contain impurities.

In the regeneration of the chemical copper plating solution in the present example, as shown in FIG. 2, the acid tank 17, the valve 18 and the acid mixing tank 19 for controlling the pH are added to the line to the electrodialysis cell 9 of FIG. 1. Thus, it is desirable to detect concentrations of accumulated ions in the chemical copper plating solution in the manner as shown in FIG. 2.

That is, detection of concentration of $CO^{-2}$ in the chemical copper plating solution is carried out separately on account of the pH control. Concentration of $CO_3^{-2}$ ions is detected by sampling a hydrochloric acid solution 24 containing quinone and hydroquinone and the chemical copper plating solution by a constant rating pump 23 and mixed together in equal volumes in a mixer 25, and the resulting mixed solution is in contact with platinum electrode 27 in an analysis cell 26 to detect a pH change after the acid mixing as a potential difference from reference electrode 28. When the potential difference shown in a volt meter 29 is larger than the predetermined value on account of the accumulation of $CO_3^{-2}$, the valve 18 for controlling pH is opened to add the acid to the chemical copper plating solution, and at the same time the circulating pumps 5, 11 and 15 and an electric source 30 for electrodialysis are driven.

On the other hand, other species of the accumulated ions than $CO_3^{-2}$ can be detected in the same small electrodialysis cell 31 for analysis as shown in FIG. 1, but in that case, a polyvalent organic acid solution 32 is mixed into the chemical copper plating solution in equal volumes in a mixer to eliminate the influence of $CO_3^{-2}$, and then concentrations of other species of accumulated ions than $CO_3^{-2}$ can be detected by a current meter 35 by electrodialysis under the constant potential from a constant potential source 34 in the same manner as in FIG. 1.

Chemical plating was repeated while regenerating the chemical copper plating solution in the regenerating system of the structure is described above in the same manner as in Example 1, that is, firstly after the 4th run of plating, and thereafter at every three runs of plating. Results are shown in Table 4.

Regeneration according to the present invention could considerably recover the mechanical properties of plating film, and the selective permeation coefficient of carbonate ions at the electrodialysis was about 1.0 on the basis of formate ions. Discharge of the essential components of the plating solution, Cu-EDTA$^{-2}$ and EDTA$^{-2}$ by electrodialysis could be also controlled to 1-2% of the initial concentrations thereof in the plating solution by one run of electrodialysis (results of electrodialysis before successive plating are shown in parentheses after the 14th run of plating). The concentrations of the chelating agent and copper ions in effluent water formed by the dialysis were dischargeable ones without any further treatment.

The regenerated plating solution leaving the electrodialysis cell 9 is mixed with a caustic soda solution in an alkali solution mixing tank 22 provided with an alkali solution tank 20 and a valve 21 and provided between the outlet for the regenerated plating solution from the electrodialysis cell 9 and the inlet for the regenerated plating solution to the plating tank 1 of the system of FIG. 1, as shown in FIG. 2 to adjust the pH of the regenerated plating solution to 11-12. Then, the regenerated plating solution with the adjusted pH was led to the plating tank 11 and again used for plating.

| 37% formalin | 5 ml |
| $\alpha,\alpha'$-dipyridyl | 20 mg |
| Polyethyleneglycol-stearylamine | 100 mg |
| $K_2S$ | 0.01 mg |
| NaOH | amount to make pH 12.3 |
| Water | amount to make 1 l |
| (b) Copper ion makeup solution: | |
| $Cu(HCOO)_2 \cdot 4H_2O$ | 13 g |
| Water | amount to make 1 l |
| (c) Formaldehyde makeup solution: | |
| 37% formalin | 300 ml |
| Water | amount to make 1 l |
| (d) pH-controlling solution: | |
| NaOH | 200 g |
| Water | amount to make 1 l |

The plating reaction-inhibiting ions accumulated in the chemical copper plating solution from the chemical copper plating solution, makeup solutions and pH-controlling solution having the above-mentioned compositions were three species, i.e. $HCOO^-$, $CO_3^{-2}$ and $Na^+$.

Electrodialysis of the used chemical copper plating solution was carried out in the same system as shown in FIG. 1 firstly after four runs of plating, and thereafter after every three runs of plating.

In the present Example, the pH-controlling step as used in Example 3 was omitted, and a combination of selectively monovalent anion permeable membranes (Cellemion ASV, trademark of the produce made by Asahi Glass Co., Ltd., Japan) with the cation exchange membranes (Cellemion CMV, trademark of the product made by Asahi Glass Co., Ltd., Japan) was used in the electrodialysis cell 9 of FIG. 1.

In the present Example, the chemical copper plating solution was regenerated by electrodialysis at a current density of 2 A/dm$^2$ for 2-4 hours in the same manner as in Example 1, i.e. firstly after four runs of plating, and

TABLE 4

| Plating run | 1st | 2nd | 3rd | 4th | 5th | 6th | 7th | 8th | 29th | 38th | 50th |
|---|---|---|---|---|---|---|---|---|---|---|---|
| Tensile strength (kg/mm$^2$) | 45.3 | 48.1 | 51.2 | 50.3 | 51.0 | 53.5 | 52.3 | 53.5 | 52.3 | 50.6 | 51.5 |
| Elongation (%) | 6.0 | 5.5 | 4.2 | 2.8 | 5.6 | 5.3 | 4.8 | 5.2 | 5.1 | 5.8 | 5.7 |
| Formate ion concentration (M/l) | 0.25 | 0.43 | 0.62 | 0.93 | 0.22 | 0.39 | 0.54 | 0.20 | 0.25 | 0.22 | 0.23 |
| Carbonate ion concentration (M/l) | 0.02 | 0.02 | 0.03 | 0.05 | 0.05 | 0.06 | 0.07 | 0.05 | 0.07 | 0.07 | 0.10 |
| Sodium ion concentration (M/l) | 0.53 | 0.60 | 0.85 | 1.2 | 0.49 | 0.72 | 0.85 | 0.44 | 0.51 | 0.48 | 0.58 |
| Discharge percent of copper ion and chelating agent (%) | — | — | — | 1.5 | — | — | 1.3 | — | (1.8) | (1.5) | (2.0) |

EXAMPLE 4

Chemical copper plating was carried out in the same manner as in Example 1, except that solutions having the following compositions and the following selectively monovalent anion permeable membranes in place of the anion exchange membranes of Example 1 were used.

| (a) Chemical copper plating solution: | |
|---|---|
| $Cu(HCOO)_2 \cdot 4H_2O$ | 10 g |
| EDTA 2 Na | 40 g | thereafter after every three runs of plating. Results are shown in Table 5. It is seen therefrom that quite similar considerable effect upon stabilization of the mechanical properties of plating film as in Example 1 but can be obtained except that the amount of copper ions and chelating agent discharged by regenerating operation tends to gradually increase from one regenerating operation to another in accordance with the increasing accumulation of $CO_3^{-2}$ in the chemical copper plating solution. Furthermore, the selective permeation coefficient of $CO_3^{-2}$ of the selectively monovalent permeable membrane is substantially zero at the electrodialysis, and thus it is difficult to remove $CO_3^{-2}$.

TABLE 5

| Plating run | 1st | 2nd | 3rd | 4th | 5th | 6th | 7th | 8th | 9th | 10th |
|---|---|---|---|---|---|---|---|---|---|---|
| Tensile strength (kg/mm$^2$) | 46.2 | 47.5 | 50.6 | 51.5 | 50.3 | 50.8 | 51.3 | 51.6 | 50.3 | 52.0 |
| Elongation (%) | 6.4 | 6.0 | 5.2 | 4.0 | 5.4 | 5.8 | 4.7 | 4.8 | 4.6 | 5.3 |
| Formate ion concentration (M/l) | 0.22 | 0.40 | 0.58 | 0.83 | 0.19 | 0.37 | 0.56 | 0.10 | 0.35 | 0.58 |
| Carbonate ion concentration (M/l) | 0.02 | 0.03 | 0.05 | 0.05 | 0.06 | 0.08 | 0.11 | 0.11 | 0.15 | 0.18 |
| Sodium ion concentration (M/l) | 0.48 | 0.65 | 0.93 | 1.1 | 0.51 | 0.73 | 0.95 | 0.58 | 0.81 | 1.0 |
| Discharge percent of copper ion and chelating agent (%) | — | — | — | 0.08 | — | — | 0.23 | — | — | 0.59 |

EXAMPLE 5

Regeneration of chemical copper plating solution was carried out in the same manner as in Example 3 except that solutions having the following composition and the following selectively monovalent anion permeable membranes in place of the anion exchange membranes of Example 2 were used.

| (a) Chemical copper plating solution: | |
|---|---|
| Cu(HCOO)$_2$ . 2H$_2$O | 10 g |
| EDTA2Na | 40 g |
| 37% formalin | 5 ml |
| α,α'-dipyridyl | 20 mg |
| Polyethyleneglycol-stearylamine | 100 mg |
| K$_2$S | 0.01 mg |
| NaOH | amount to make pH 12.3 |
| Water | amount to make 1 l |
| (b) Copper ion makeup solution: | |
| Cu(HCOO)$_2$ . 4H$_2$O | 13 g |
| Water | amount to make 1 l |
| (c) Formaldehyde makeup solution: | |
| 37% formalin | 300 ml |
| Water | amount to make 1 l |
| (d) pH-controlling solution: | |
| NaOH | 200 g |
| Water | amount to make 1 l |

The plating reaction-inhibiting ions accumulated in the chemical copper plating solution from the chemical copper plating solution, makeup solutions and pH-controlling solution having the above-mentioned compositions are such species of monovalent ions as HCOO$^{-1}$ and Na$^+$. Furthermore, carbon dioxide absorbed into the chemical copper plating solution from air was replaced by formic acid as permeable monovalent ions, characteristic of the present invention. That is, 10–25 ml of formic acid was added to the carbon dioxide-absorbed chemical copper plating solution to replace CO$_3^{-2}$ with HCOO$^-$, and then the plating solution was supplied to the desalting compartments of the electrodialysis cell. Absorption of carbon dioxide depends upon the working conditions of chemical copper plating solution, and even if carbon dioxide is accumulated in the plating solution as in the present Example, the foregoing replacement operation can obviously satisfy the electrodialysis as monovalent ions, characteristic of the present invention.

In the present Example, the plating solution was cooled to the room temperature firstly after four runs of plating and thereafter after every three runs of plating, and the absorbed carbon dioxide was replaced with formic acid in the manner as described above. Then, the plating solution was admixed with NaOH to return the pH of the plating solution to 12.3, and subjected to electrodialysis for 2 to 4 hours, using the same concentration solution and electrode solution as in Example 3.

In the electrodialysis, the cations to be removed were only Na$^+$, and there were no other species of cations to be desirably removed. Thus, it was not necessary to use particularly the selectively monovalent cation permeable ion exchange membrane, and consequently the Cellemion CMV (trademark of the product made by Asahi Glass Co., Ltd., Japan) having a relatively good alkali resistance was used as the cation exchange membrane.

On the other hand, the anions to be removed were only HCOO$^-$, but there were the anions which are not desirable to remove, that is, EDTA-chelated ions such as Cu-EDTA$^{-2}$ and EDTA$^{-4}$, and OH$^-$, which constituted a multi-component system together with HCOO$^-$. Thus, selectively monovalent anion permeable anion exchange membranes, Cellemion ASV (trademark of a product made by Asahi Glass Co., Ltd., Japan) was used as the anion exchange membranes.

Results of regenerating the chemical copper plating solution are given in Table 6. It is obvious therefrom that the mechanical properties of plating film can be considerably recovered, and the amount of copper ions discharged into the concentration solution by one run of electrodialysis can be remarkably reduced to less than about 0.1% of the initial concentration in the plating solution (results of regeneration before the successive plating are given in parentheses after the 14th run of plating).

Furthermore, the concentration of copper ions in the same volume of the concentration solution as that of the chemical copper plating solution was analyzed by atomic absorption spectrometry, and it was found that it could be reduced to such a trace amount as less than 3 ppm, as shown in Table 6. Furthermore, the chelating agent, EDTA, could not be detected by a spectrophotometer, and the selective permeation coefficient of Cu-EDTA$^{-2}$ on the basis of HCOO$^-$ was as small as about $2 \times 10^{-3}$.

A very small amount of copper ions to be discharged is such a concentration as disposable only by dilution to less than an allowable limit without any additional treatment.

As is obvious from the foregoing Examples, the life of a chemical copper plating solution can be made eternal only by properly selecting a combination of a chemical copper plating solution, makeup solutions and pH-controlling solution and using ion exchange membranes with appropriate characteristics in the regeneration of a chemical copper plating solution according to the present invention without requiring special apparatuses, and at the same time the waste solution treatment so far indispensable is made unnecessary in the present invention. Thus, the present invention has a very remarkable effect.

in Example 5, were used as the anion exchange membranes for the electrodialysis.

The membrane, Cellemion CSV, was not satisfactory in the alkali resistance, and thus formic acid was added to the plating solution to make pH 8, and then the plating solution was electrodialyzed. After the electrodialy-

TABLE 6

| Plating run | 1st | 2nd | 3rd | 4th | 5th | 6th | 7th | 8th | 14th | 20th | 29th |
|---|---|---|---|---|---|---|---|---|---|---|---|
| Elongation (%) | 4.3 | 4.1 | 3.7 | 3.5 | 4.5 | 4.4 | 4.2 | 4.6 | 4.6 | 4.9 | 4.5 |
| Tensile strength (kg/mm$^2$) | 51.0 | 48.2 | 50.2 | 51.0 | 45.8 | 47.6 | 48.3 | 46.1 | 45.8 | 43.6 | 46.4 |
| Formate ion concentration (M/l) | 0.09 | 0.21 | 0.28 | 0.39 | 0.04 | 0.15 | 0.22 | 0.05 | 0.03 | 0.05 | 0.07 |
| Carbonate ion concentration (M/l) | 0.02 | 0.07 | 0.15 | 0.16 | 0.05 | 0.06 | 0.13 | 0.06 | 0.02 | 0.04 | 0.05 |
| Sodium ion concentration (M/l) | 0.15 | 0.42 | 0.65 | 0.78 | 0.20 | 0.29 | 0.56 | 0.21 | 0.11 | 0.18 | 0.25 |
| Discharge percent of copper ions (%) | — | — | — | — | 0.08 | — | — | 0.04 | 0.08 | 0.08 | 0.12 |
| Copper ion concentration in concentration solution (ppm) | — | — | — | 2 | — | — | 1 | — | (2) | (2) | (3) |

EXAMPLE 6

Regeneration of chemical copper plating solution was carried out in the same manner as in Example 5 in the same apparatus as used in Example 5, using solutions of the following composition.

| (a) Chemical copper plating solution: | |
|---|---|
| Cu(HCOO)$_2$ . 4H$_2$O | 10 g |
| Rochelle salt | 50 g |
| 37% formalin | 20 ml |
| NaOH | amount to make pH 12.5 |
| 2,9-dimethylphenanthroline | 10 mg |
| Polyethyleneglycol-stearylamine | 100 mg |
| Water | amount to make 1 l |
| (b) Copper ion makeup solution: | |
| Same as in Example 5 | |
| (c) Formaldehyde makeup solution: | |
| Same as in Example 5 | |
| (d) pH-controlling solution: | |
| Same as in Example 5 | |

The above-mentioned chemical copper plating solution was somewhat unstable, and the mechanical properties of plating film were also not satisfactory. Furthermore, it was observed that the plating solution tended to decompose by one run of plating to a plating thickness of 30 μm. Thus, regeneration of the plating solution was carried out by electrodialysis after every run of plating to a plating thickness of 30 μm to improve the stability of plating solution.

The cations in the plating solution from the solutions of the above-mentioned composition was Na$^+$ and K$^+$, and the accumulated cations are substantially Na$^+$. However, the chelate formation constant of tartate ions was so small that there is a larger amount of Cu$^{+2}$. To prevent the dialysis of Cu$^{+2}$, selectively monovalent cation permeable, cation exchange membrane, Cellemion CSV (trademark of a product made by Asahi Glass Co., Ltd., Japan) was used as the cation exchange membranes, and selectively monovalent anion permeable membranes, Cellemion ASV (trademark of a product made by Asahi Glass Co., Ltd., Japan), the same as used sis, the pH of the regenerated plating solution was returned to the predetermined value by a concentrated NaOH solution, and recycled to the plating tank for repetition of plating.

The considerable decomposition of the plating solution could be prevented by the regeneration, and also plating films having the desired mechanical properties could be obtained. The discharge of copper ions could be controlled to the same value as in Example 5.

What is claimed is:

1. A process for regenerating a chemical copper plating solution, which comprises adjusting pH of a solution containing copper ions, a reducing agent for copper ions, a chelating agent for copper ions and an alkali metal hydroxide as essential components, used in chemical copper plating, to 2–11, leading the plating solution to desalting compartments of an electrodialysis cell, provided alternately with anion exchange membranes and cation exchange membranes, and removing counter ions to copper ions, ions formed by oxidation reaction of the reducing agent, and $CO_3^{-2}$ or $HCO_3^-$ formed from carbon dioxide dissolved in the plating solution, which have an inhibiting effect upon chemical copper plating, and alkali metal ions which is free from inhibition of chemical copper plating, accumulated in the solution used in the chemical copper plating by electrodialysis.

2. A process according to claim 1, wherein the counter ions to copper ions are at least one of $SO_4^{-2}$, $HCOO^{-1}$, $CO_3^{-2}$ and $OH^-$; the reducing agent is HCHO, the ions formed by the oxidation of the reducing agent is $HCOO^-$, the alkali metal ions are Na$^+$ or K$^+$, the anion exchange membranes are monovalent and divalent anion permeable membranes and the cation exchange membranes are monovalent and divalent cation permeable membranes.

3. A process according to claim 1, wherein the pH-controlling acid is at least one of sulfuric acid, perchloric acid, formic acid and acetic acid, the counter ions to copper ions are at least one of $SO_4^{-2}$, $HCOO^{-1}$, $CO_3^{-2}$ and $OH^-$; the reducing agent is HCHO, the ions formed by the oxidation of the reducing agent is $HCOO^-$, the alkali metal ions are $Na^+$ or $K^+$, the anion exchange membranes are selectively monovalent anion permeable membranes, and the cation exchange membranes are monovalent and divalent cation permeable membranes.

4. A process according to claim 2, 1 or 3, wherein the pH of the solution is adjusted to 2–8 to remove $CO_3^{-2}$ having a low selective permeability at the electrodialysis and at the same time to make the selective permeabilities of a group of the accumulated ions in the plating solution substantially equal to one another in advance.

5. A process according to claim 2, 1 or 3, wherein the pH of the solution is adjusted to values higher than 8 but not higher than 11 to convert $CO_3^{-2}$ to $HCO_3^-$.

6. A process according to claim 1, wherein the anion exchange membranes are selectively monovalent anion permeable membranes and the cation exchange membranes are selectively monovalent cation permeable membranes.

* * * * *